United States Patent
Sun et al.

(10) Patent No.: US 11,449,965 B2
(45) Date of Patent: Sep. 20, 2022

(54) PROCESSING METHOD FOR IMAGE TENSOR DATA

(71) Applicant: Beijing University of Technology, Beijing (CN)

(72) Inventors: Yanfeng Sun, Beijing (CN); Fujiao Ju, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 309 days.

(21) Appl. No.: 16/735,722

(22) Filed: Jan. 7, 2020

(65) Prior Publication Data
US 2020/0234405 A1 Jul. 23, 2020

(30) Foreign Application Priority Data
Jan. 17, 2019 (CN) .......................... 201910042613.4

(51) Int. Cl.
| | |
|---|---|
| *G06T 3/40* | (2006.01) |
| *G06N 20/10* | (2019.01) |
| *G06F 17/18* | (2006.01) |
| *G06N 3/08* | (2006.01) |

(52) U.S. Cl.
CPC ............ *G06T 3/4046* (2013.01); *G06F 17/18* (2013.01); *G06N 3/08* (2013.01); *G06N 20/10* (2019.01); *G06T 3/4053* (2013.01)

(58) Field of Classification Search
CPC combination set(s) only.
See application file for complete search history.

(56) References Cited

PUBLICATIONS

Wang et al., "Tensor Ring Restricted Boltzmann Machines", Jul. 1, 2019, 2019 International Joint Conference on Neural Networks (IJCNN) (Year: 2019).*
Han et al., "Unsupervised Generative Modeling Using Matrix Product States", Sep. 6, 2017, ArXiv (Year: 2017).*
Chen et al., "Equivalence of restricted Boltzmann machines and tensor network states", Jan. 17, 2017, Physical Review, ArXiv (Year: 2017).*
Chen et al., "Matrix Product Operator Restricted Boltzmann Machines", Nov. 12, 2018, 2019 International Joint Conference on Neural Networks (IJCNN) (Year: 2018).*
Liu et al., "Matrix Variate RBM Model with Gaussian Distributions", 2017, IEEE, pp. 808-815 (Year: 2017).*

(Continued)

*Primary Examiner* — Zhiyu Lu
(74) *Attorney, Agent, or Firm* — Bayramoglu Law Offices LLC

(57) ABSTRACT

A processing method for image tensor data, which can greatly reduce the number of free parameters in the model, limit the weight layer flexibly, and can be applied to any order of image tensor data. In this processing method for image tensor data, TTRBM model of Restricted Boltzmann machine with tensor train format is introduced. The input and output data of this method are both represented by tensors, and the weight of the middle layer is also represented by tensors, and the restricted weight has the structure of tensor train. The number of free parameters in the middle layer is controlled by adjusting the rank of tensor train decomposition. The rank of TT decomposition is adjusted, and different feature representations with the same size are expressed.

4 Claims, 2 Drawing Sheets

(56) References Cited

PUBLICATIONS

Imaizumi et al., "On Tensor Train Rank Minimization: Statistical Efficiency and Scalable Algorithm", 2017, 31st Conference on Neural Information Processing Systems (Year: 2017).*

Kormann, "Low-rank tensor discretization for high-dimensional problems", Aug. 6, 2017, arxiv.org (Year: 2017).* http://decsai.ugr.es/cvg/dbimagenes/.

Li Ming, Yuan Baozong, "2D-LDA: A statistical linear discriminant analysis for image matrix", Pattern Recognition Letters 26 (2005) 527-532.

Chu Delin, et al., "Incremental Linear Discriminant Analysis: A Fast Algorithm and Comparisons", IEEE Transaactions on Neural Networks and Learning Systems, vol. 26, No. 11, Nov. 2015.

Simon J.D. Prince, James H. Elder, "Probabilistic Linear Discriminant Analysis for Inferences About Identity", IEEE, 2007.

Wen Jie, et al., "Robust Sparse Linear Discriminant Analysis", IEEE Transaction on Circuits and Systems for Video Technology, vol. 29, No. 2, Feb. 2019.

Lai Zhihui, et al., "Sparse Tensor Discriminant Analysis" IEEE Transactions on Image Processing, vol. 22, No. 10, Oct. 2013.

\* cited by examiner

PROCESSING METHOD FOR IMAGE TENSOR DATA

CROSS REFERENCE TO THE RELATED APPLICATIONS

This application is based upon and claims priority to Chinese Patent Application No. CN201910042613.4, filed on Jan. 17, 2019, the entire contents of which are incorporated herein by reference.

TECHNICAL FIELD

The present invention relates to the technical field of data processing, and particularly to a processing method for image tensor data, which can be directly applied to any order of image tensor data.

BACKGROUND

Restricted Boltzmann machine (RBM) is a two-layer neural network composed of visible layer and hidden layer. Because of its strong ability of feature representation, RBM is widely used in pattern recognition and machine learning. In traditional RBM, both visible and hidden layer data are represented in vector form.

However, today data from real life often has multi-dimensional characteristics. In order to apply RBM to these multi-dimensional data, the common method is to vectorize the data. The process of vectorizing often destroys the internal structure of multi-dimensional data, leading to the loss of important association information, or the problem of dimensional disaster. In addition, RBM is a model with fully connected network structure. With the growth of data dimension, the parameters in the model will grow exponentially. Therefore, more storage space and higher computational complexity are needed, which makes RBM algorithm not suitable for ordinary devices or multi-dimensional data applications.

SUMMARY

The technical problem addressed by the present invention is to overcome the deficiency in the prior art, and to provide a processing method for image tensor data, which can greatly reduce the number of free parameters in the model, limit the weight layer flexibly, and can be applied to any order of image tensor data.

The technical solution of the present invention is that, in this processing method for image tensor data, TTRBM model of Restricted Boltzmann machine with tensor train format is introduced. The input and output data of this method are both represented by tensors, and the weight of the middle layer is also represented by tensors, and the restricted weight has the structure of tensor train. The number of free parameters in the middle layer is controlled by adjusting the rank of tensor train decomposition. The rank of TT decomposition is adjusted, and different feature representations with the same size are expressed.

The model input and output data of the invention are both represented by tensors, and the weight of the middle layer is also represented by tensors. In order to reduce the weight quantity of the middle layer, the weight in the invention is limited to have the structure of tensor train. The number of free parameters in the middle layer is controlled by adjusting the rank of tensor train decomposition. The number of free parameters in the weight layer increases linearly with the dimension of sample data, so the number of free parameters in the model is greatly reduced, and the restriction of weight layer is flexible, which can be applied to any order of image tensor data.

DETAILED DESCRIPTION OF THE EMBODIMENTS

Figure 1:
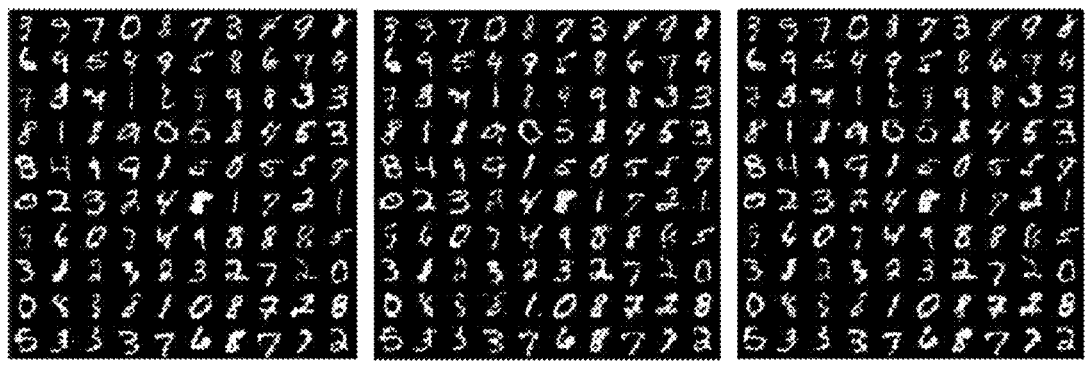
FIG. 1 shows some original digit images and their reconstruction images.

In this processing method for image tensor data, TTRBM model of Restricted Boltzmann machine with tensor train format is introduced. The input and output data of this method are both represented by tensors, and the weight of the middle layer is also represented by tensors, and the restricted weight has the structure of tensor train. The number of free parameters in the middle layer is controlled by adjusting the rank of tensor train decomposition. The rank of TT decomposition is adjusted, and different feature representations with the same size are expressed.

The model input and output data of the invention are both represented by tensors, and the weight of the middle layer is also represented by tensors. In order to reduce the weight quantity of the middle layer, the weight in the invention is limited to have the structure of tensor train. The number of free parameters in the middle layer is controlled by adjusting the rank of tensor train decomposition. The number of free parameters in the weight layer increases linearly with the dimension of sample data, so the number of free parameters in the model is greatly reduced, and the restriction of weight layer is flexible, which can be applied to any order of image tensor data.

Preferably, energy function for TTRBM model is formula (1):

$$E(\mathcal{X}, \mathcal{Y}; \Theta) = -\langle \mathcal{X}, \mathcal{B}\rangle - \langle \mathcal{Y}, \mathcal{C}\rangle - \sum_{\substack{i_1,\ldots,i_D \\ j_1,\ldots,j_D}} \mathcal{X}(i_1,\ldots,i_D)\mathcal{Y}(j_1,\ldots,j_D)G_1[i_1,j_1]\ldots G_D[i_D,j_D] \quad (1)$$

Where $\mathcal{X} \in \mathbb{R}^I$, $\mathcal{Y} \in \mathbb{R}^J$ are tensor visible and hidden units, respectively, both of them are binary variables. In the network, $b \in \mathbb{R}^I$ and $c \in \mathbb{R}^J$ are the biases, $W \in \mathbb{R}^{I \times J}$ is the parameter matrix connecting visible and hidden units. Denoting all model parameter as $\Theta = \{b, c, W\}$. Where $G_d[i_d, j_d]$ is an $r_{d-1} \times r_d$ matrix and $G_d$ is $r_{d-1} \times I_d \times J_d \times r_d$ array. The sequence $\{r_d\}_{d=0}^D$ is the TT-ranks of the TT-format of W. Based on the above-mentioned energy function, the joint distribution of $\mathcal{X}$ and $\mathcal{Y}$ can be defined as $$p(\mathcal{X}, \mathcal{Y}; \Theta) = \frac{1}{Z(\Theta)} \exp\{-E(\mathcal{X}, \mathcal{Y}; \Theta)\}$$

Where $\Theta$ denotes bias B,C, and all the model parameter matrices $\{G_d[i_d, j_d]\}_{d=1}^D$. In the above-mentioned joint distribution, $Z(\Theta)$ is the normalization constant and defined by $$Z(\Theta) = \sum_{X \in \mathbb{X}, \mathcal{Y} \in \mathbb{Y}} \exp\{-E(X, \mathcal{Y}; \Theta)\}$$

Where $\mathbb{X}$ and $\mathbb{Y}$ represent the binary value spaces of $X$ and $\mathcal{Y}$, respectively.

Preferably, in formula (1), over all the other variables, the conditional density of each visible unit $X$ $(i_1, \ldots, i_D)$ can be deduced by $$p(X(i_1, \ldots, i_D) = 1 \mid \mathcal{Y}; \Theta) = \qquad (2)$$

$$\sigma\left(\sum_{j_1, \ldots, j_D} G_1[i_1, j_1] \ldots G_D[i_D, j_D] \mathcal{Y}(j_1, \ldots, j_D) + \mathcal{B}(i_1, \ldots, i_D)\right)$$

And over all the other variables, the conditional density of each hidden unit $\mathcal{Y}$ $(j_1, \ldots, j_D)$ can be deduced by $$p(\mathcal{Y}(j_1, \ldots, j_D) = 1 \mid X; \Theta) = \qquad (3)$$

$$\sigma\left(\sum_{i_1, \ldots, i_D} G_1[i_1, j_1] \ldots G_D[i_D, j_D] X(i_1, \ldots, i_D) + C(j_1, \ldots, j_D)\right)$$

Where $\sigma$ is sigmoid function and $\sigma(x) = 1/(1+e^{-x})$.

Preferably, supposing $\mathcal{D} = \{X_1, \ldots, X_N\}$ is observed dataset, the log likelihood of dataset is defined as follows under the joint distribution:

$$l = \frac{1}{N} \sum_{n=1}^{N} \log\left(\sum_{\mathcal{Y} \in \mathbb{Y}} \exp\{-E(X_n, \mathcal{Y})\}\right) - \log Z(\Theta)$$

With respect to any parameter $\theta$ in $\Theta$ is $$\frac{\partial l}{\partial \theta} = -\frac{1}{N} \sum_{n=1}^{N} \sum_{\mathcal{Y} \in \mathbb{Y}} p(\mathcal{Y} \mid X_n; \Theta) \frac{\partial E(X_n, \mathcal{Y}; \Theta)}{\partial \theta} +$$

$$\sum_{X' \in \mathbb{X}, \mathcal{Y}' \in \mathbb{Y}} p(X', \mathcal{Y}'; \Theta) \frac{\partial E(X', \mathcal{Y}'; \Theta)}{\partial \theta}$$

Collecting a series of sample sets by means of Gibbs sampling, first, selecting a sample $X_n^{(0)}$ from the training sample set as initialization and then obtain by iterative sampling $$\{(X_n^{(0)}, \mathcal{Y}_n^{(0)}), (X_n^{(1)}, \mathcal{Y}_n^{(1)}), \ldots, (X_n^{(k)}, \mathcal{Y}_n^{(k)}), \ldots\}$$

Replace the model expectation by $\{X_n^{(k)}\}_{n=1}^{N}$.

$$\frac{\partial l}{\partial \theta} \approx -\frac{1}{N} \sum_{n=1}^{N} \sum_{\mathcal{Y} \in \mathbb{Y}} p(\mathcal{Y} \mid X_n; \Theta) \frac{\partial E(X_n, \mathcal{Y}; \Theta)}{\partial \theta} + \qquad (4)$$

$$\frac{1}{N} \sum_{n=1}^{N} \sum_{\mathcal{Y}' \in \mathbb{Y}} p(\mathcal{Y}' \mid X_n^{(k)}; \Theta) \frac{\partial E(X_n^{(k)}, \mathcal{Y}'; \Theta)}{\partial \theta}$$

Denoting two notations $i_d^- := (i_1, \ldots, i_{d-1})$ and $i_d^+ = (i_{d+1}, \ldots, i_D)$, therefore, core matrices are respectively $$P_d^-[\hat{i}_d^-, \hat{j}_d^-] := G_1[i_1, j_1] \ldots G_{d-1}[i_{d-1}, j_{d-1}] \text{ and}$$

$$P_d^+[i_d^+, j_d^+] := G_{d+1}[i_{d+1}, j_{d+1}] \ldots G_D[i_D, j_D]$$

The derivative for formula (1) with respect to the core matrix $G_d[\tilde{i}_d, \tilde{j}_d]$ is $$\frac{\partial E(X, \mathcal{Y}; \Theta)}{\partial G_d[\tilde{i}_d, \tilde{j}_d]} = \qquad (5)$$

$$-\sum_{\substack{i_d^-, i_d^+ \\ j_d^-, j_d^+}} X(i_d^-, \tilde{i}_d, i_d^+) \mathcal{Y}(j_d^-, \tilde{j}_d, j_d^+) (P_d^-[i_d^-, j_d^-])^T (P_d^+[i_d^+, j_d^+])^T$$

Because $\mathcal{Y}$ or $\mathcal{Y}$ is binary variable, the probability of $\mathcal{Y} = 1$ is actually the mean value of $\mathcal{Y}$. By inserting formula (5) into formula (3), the bias derivative of likelihood function to $G_d[\tilde{i}_d, \tilde{j}_d]$ is $$\frac{\partial l}{\partial G_d[\tilde{i}_d, \tilde{j}_d]} \approx \qquad (6)$$

$$\frac{1}{N} \sum_{n=1}^{N} \sum_{\substack{i_d^-, i_d^+ \\ j_d^-, j_d^+}} p(\mathcal{Y}_n(j_d^-, \tilde{j}_d, j_d^+) = 1 \mid X_n; \Theta) \times X_n(i_d^-, \tilde{i}_d, i_d^+)$$

$$(P_d^-[i_d^-, j_d^-])^T (P_d^+[i_d^+, j_d^+])^T -$$

$$\frac{1}{N} \sum_{n=1}^{N} \sum_{\substack{i_d^-, i_d^+ \\ j_d^-, j_d^+}} p(\mathcal{Y}_n^{(l)}(j_d^-, \tilde{j}_d, j_d^+) = 1 \mid X_n^{(k)}; \Theta) \times$$

$$X_n^{(k)}(i_d^-, \tilde{i}_d, i_d^+)(P_d^-[i_d^-, j_d^-])^T (P_d^+[i_d^+, j_d^+])^T$$

For the bias parameters, obtain $$\frac{\partial l}{\partial \mathcal{B}} \approx \frac{1}{N} \sum_{n=1}^{N} X_n - \frac{1}{N} X_n^{(k)} \text{ and} \qquad (7)$$

$$\frac{\partial l}{\partial C} \approx \frac{1}{N} \sum_{n=1}^{N} p(\mathcal{Y}_n = 1 \mid X_n; \Theta) - \frac{1}{N} \sum_{n=1}^{N} p(\mathcal{Y}_n^{(k)} = 1 \mid X_n^{(k)}; \Theta). \qquad (8)$$

Preferably, the processing method for image tensor data including the following steps:

(1) Given the training dataset $\mathcal{D} = \{X_1, \ldots, X_N\}$ consisting of N tensors samples, the maximum iteration number T(default value=10000) and $\epsilon$, the learning rate $\alpha$ (default value=0.05), the weight regularizer $\beta$ (default value=0.01), the momentum $\gamma$ (default value=0.5), the batch size b (default value=100), and the CD step K (default value=1).

(2) Initializing $G_d[i_d, j_d]$ randomly, B=0, C=0 and $\Delta G_d[i_d, j_d] = \Delta B = \Delta C = 0$.

(3) For t=1:T do:

Divide $\mathcal{D}$ into M batches $\mathcal{D}_1, \ldots, \mathcal{D}_M$ of size b randomly, then For m=1:M do:

fixing current model parameters $\Theta$, rum the Gibbs sampling for all the data $X^{(0)} = X \in \mathcal{D}_m$.

For k=0:K-1 do

Fixing $X^{(k)}$, update $\mathcal{Y}^{(k)}$ according to formula (3);

Fixing $\mathcal{Y}^{(k)}$, update $X^{(k)}$ according to formula (2);

end;

Update the gradient increment by using (6)-(8):

$$\Delta G_d[i_d, j_d] = \gamma \Delta G_d[i_d, j_d] + \alpha\left(-\frac{\partial l}{\partial G_d[i_d, j_d]}\bigg|_{\mathcal{D}_M, \mathcal{D}_m^{(K)}} - \beta G_d[i_d, j_d]\right)$$

$$\Delta \mathcal{B} = \gamma \Delta \mathcal{B} + \alpha\left(-\frac{\partial l}{\partial \mathcal{B}}\bigg|_{\mathcal{D}_m, \mathcal{D}_m^{(K)}}\right)$$

$$\Delta C = \gamma \Delta C + \alpha\left(-\frac{\partial l}{\partial C}\bigg|_{\mathcal{D}_m, \mathcal{D}_m^{(K)}}\right)$$

Update model parameters: $\theta \rightarrow \theta + \Delta\theta$, end
Computing e(t). If $|e(t)-e(t+1)|<\epsilon$, break:
end.

Preferably, this method is used to describe the generation model of learning a kind of data. This model contains many kinds of data input, which is defined as multimodal TTRBM.

Preferably, in the training phrase, five matrix patches (X, $Z^1$, $Z^2$, $Z^3$, $Z^4$) are used as a training sample. X represents a high resolution patch, which is the raw image from the luminance Y channel in the YCbCr color space and ($Z^1$, $Z^2$, $Z^3$, $Z^4$) are low resolution patches, which are the directives of images in x-,y-,xx-,yy-directions of the Y channel. (X, $Z^1$, $Z^2$, $Z^3$, $Z^4$) can be seen as visible units, which are connected to the hidden layer Y. Thus, formula (1) can be $$E(X, Z^1, \ldots, Z^4, Y; \Theta) = -\langle X, B\rangle - \langle Y, C\rangle - $$
$$\sum_{i=1}^{4}\langle Z^i, A_i\rangle - \sum_{\substack{i_1,i_2\\j_1,j_2}} X(i_1, i_2)Y(j_1, j_2)G_1[i_1, j_1]G_2[i_2, j_2] - $$
$$\sum_{i=1}^{4}\sum_{\substack{i_1^i,i_2^i\\j_1,j_2}} Z(i_1^i, i_2^i)Y(j_1, j_2)Q_1^i[i_1^i, j_1]Q_2^i[i_2^i, j_2]$$

The joint distribution becomes $$p(X, Z^1, \ldots, Z^4, Y; \Theta) = \frac{1}{Z(\Theta)}\exp\{-E(X, Z^1, \ldots, Z^4, Y; \Theta)\}$$

To obtain training patches, image patches are taken from 69 miscellaneous color images, thus obtain the training set as D={$(X_1, Z_1^1, Z_1^2, Z_1^3, Z_1^4), \ldots, (X_N, Z_N^1, Z_N^2, Z_N^3, Z_N^4)$} and randomly selected N=10000, training patches from the miscellaneous database. The image patch size was fixed to 15*15 with a magnification factor of 2 and the hidden size to 20*20.

In testing phase, giving a low resolution image, its four low resolution feature input Z={$Z^1$, $Z^2$, $Z^3$, $Z^4$} can be obtained. Then an estimated $X^0$ of the desired super-resolution patch is obtained by using any simple super-resolution algorithm. Furthermore, $X^0$ and Z were used as the inputs of visible layer and the proposed TTRBM training algorithm is run. In this process, the message of the visible layer can be transferred to the hidden layer and getting the variable Y. Moreover, the message of the hidden layer will be transferred back to the visible layer and obtaining the super-resolution units X. Finally, the super-resolution image patch X is obtained after the process reaches equilibrium.

The invention is described in more detail below.

The technical solution adopted by the invention is a processing method for image tensor data based on a limited Boltzmann method, and the specific implementation process of the method is as follows.

Two Dimensional Model Construction

First, TTRBM model of Restricted Boltzmann machine with tensor train format is introduced.

The traditional RBM energy function is defined as $$E(x,y; \Theta) = -x^T W y - b^T x - c^T y$$

Where $x \in \mathbb{R}^I$, $y \in \mathbb{R}^J$ are tensor visible and hidden units, respectively, both of them are binary variables. In the network, $b \in \mathbb{R}^I$ and $c \in \mathbb{R}^J$ are the biases, $W \in \mathbb{R}^{I \times J}$ is the parameter matrix connecting visible and hidden units. Denoting all model parameter as $\Theta = \{b, c, W\}$. Because the traditional RBM is based on the input and output of vector form, in order to avoid vectorization, the visible and hidden elements of tensor form are introduced, so the energy function can be changed into $$E(\mathcal{X}, \mathcal{Y}; \Theta) | = -\langle \mathcal{X}, \mathcal{B}\rangle - \langle \mathcal{Y}, \mathcal{C}\rangle - $$
$$\sum_{\substack{i_1,\ldots,i_D\\j_1,\ldots,j_D}} \mathcal{X}(i_1, \ldots, i_D)\mathcal{Y}(j_1, \ldots, j_D)W((i_1, \ldots, i_D), (j_1, \ldots, j_D))$$

where $\mathcal{X}$ and $\mathcal{Y}$ are tensor visible and hidden units. The parameters connecting $(i_1, \ldots, i_D)$-th visible unit and $(j_1, \ldots, j_D)$-th hidden unit can be represented as $W((i_1, \ldots, i_D), (j_1, \ldots, j_D))$ with $i_d=1, \ldots, I_d$ and $j_d=1, \ldots, J_{d_o}$ A major problem of fully connected layers in high-order RBM is the excessively large number of free parameters. To control the number of parameters, we introduce the TT-layer in an RBM, by assuming that the weight "matrix" W is represented in TT-format with the cores $G_d[i_d, j_d]$ (d=1, 2, ..., D). Thus, the bilinear energy function takes the following tensor form:

$$E(\mathcal{X}, \mathcal{Y}; \Theta) = -\langle \mathcal{X}, \mathcal{B}\rangle - \langle \mathcal{Y}, \mathcal{C}\rangle - \qquad (1)$$
$$\sum_{\substack{i_1,\ldots,i_D\\j_1,\ldots,j_D}} \mathcal{X}(i_1, \ldots, i_D)\mathcal{Y}(j_1, \ldots, j_D)G_1[i_1, j_1]\ldots G_D[i_D, j_D]$$

Where $G_d[i_d, j_d]$ is an $r_{d-1} \times r_d$ matrix and $G_d$ is an $r_{d-1} \times I_d \times J_d \times r_d$ array. The sequence $\{r_d\}_{d=0}^D$ is the TT-ranks of the TT-format of W. Based on (1), the joint distribution of x and y can be defined as $$p(\mathcal{X}, \mathcal{Y}; \Theta) = \frac{1}{Z(\Theta)}\exp\{-E(\mathcal{X}, \mathcal{Y}; \Theta)\}$$

Where $\Theta$ denotes bias B,C, and all the model parameter matrices $\{G_d[i_d,j_d]\}_{d=1}^D$. In the joint distribution, $Z(\Theta)$ is the normalization constant and defined by $$Z(\Theta) = \sum_{\mathcal{X} \in \mathbb{X}, \mathcal{Y} \in \mathbb{Y}} \exp\{-E(\mathcal{X}, \mathcal{Y}; \Theta)\}$$

Where $\mathbb{X}$ and $\mathbb{Y}$ represent the binary value spaces of $\mathcal{X}$ and $\mathcal{Y}$, respectively.

Solution of the Model

Before presenting the learning algorithm for TTRBM, we need to introduce the following theory to deduce the conditional probabilistic density of each visible and hidden unit.

THEOREM 1. In the model of TTRBM, over all the other variables, the conditional density of each visible unit $\mathcal{X}$ ($i_1, \ldots, i_D$) can be deduced by $$p(\mathcal{X}(i_1, \ldots, i_D) = 1 \mid \mathcal{Y}; \Theta) = \quad (2)$$

$$\sigma\left(\sum_{j_1, \ldots, j_D} G_1[i_1, j_1] \cdots G_D[i_D, j_D] \mathcal{Y}(j_1, \ldots, j_D) + \mathcal{B}(i_1, \ldots, i_D)\right)$$

And over all the other variables, the conditional density of each hidden unit $\mathcal{Y}$ ($j_1, \ldots, j_D$) can be deduced by $$p(\mathcal{Y}(j_1, \ldots, j_D) = 1 \mid \mathcal{X}; \Theta) = \quad (3)$$

$$\sigma\left(\sum_{i_1, \ldots, i_D} G_1[i_1, j_1] \cdots G_D[i_D, j_D] \mathcal{X}(i_1, \ldots, i_D) + C(j_1, \ldots, j_D)\right)$$

Where $\sigma(x) = 1/(1+e^{-x})$, which is sigmoid function.

Proof. We only need to prove one item because of symmetry of visible and hidden units.

First, we denote $$\mathcal{M}(i_1, \ldots, i_D) =$$

$$\sum_{j_1, \ldots, j_D} \mathcal{Y}(j_1, \ldots, j_D) G_1[i_1, j_1] \cdots G_D[i_D, j_D] + \mathcal{B}[i_1, \ldots, i_D]$$

And take $\mathcal{X}$ ($i'_1, \ldots, i'_D$) for consideration. Based on Bayes theorem, we have $$p(\mathcal{X}(i'_1, \ldots, i'_D) = 1 \mid \mathcal{Y}; \Theta) = \frac{p(\mathcal{X}(i'_1, \ldots, i'_D) = 1, \mathcal{Y}; \Theta)}{p(\mathcal{Y}; \Theta)}$$

Clearly, $$p(\mathcal{Y}; \Theta) = \frac{1}{Z(\Theta)} \sum_{\mathcal{X} \in \mathbb{X}} \exp\{-E(\mathcal{X}, \mathcal{Y}; \Theta)\}$$

$$= \frac{\exp(\langle \mathcal{Y}, C \rangle)}{Z(\Theta)} \sum_{\mathcal{X} \in \mathbb{X}} \prod_{i_1, \ldots, i_D} \exp(\mathcal{M}(i_1, \ldots, i_D) \mathcal{X}(i_1, \ldots, i_D))$$

$$= \frac{\exp(\langle \mathcal{Y}, C \rangle)}{Z(\Theta)} \prod_{i_1, \ldots, i_D} (1 + \exp(\mathcal{M}(i_1, \ldots, i_D))).$$

Assuming $X/i'_1, \ldots, i'_D$ is the set that contains all the entries except for X ($i'_1, \ldots, i'_D$) we can obtain $$p(\mathcal{X}(i'_1, \ldots, i'_D) = 1 \mid \mathcal{Y}; \Theta) = \frac{\exp(\langle \mathcal{Y}, C \rangle)}{Z(\Theta)}$$

$$\exp(\mathcal{M}(i'_1, \ldots, i'_D)) \times \prod_{(i_1, \ldots, i_D) \neq (i'_1, \ldots, i'_D)} \exp(1 + \mathcal{M}(i_1, \ldots, i_D))$$

Combining these together gives $$p(\mathcal{X}(i'_1, \ldots, i'_D) = 1 \mid \mathcal{Y}; \Theta) =$$

$$\frac{\exp(\mathcal{M}(i'_1, \ldots, i'_D))}{1 + \exp(\mathcal{M}(i'_1, \ldots, i'_D))} = \sigma(\mathcal{M}(i'_1, \ldots, i'_D))$$

Which is (2) for ($i_1, \ldots, i_D$) = ($i'_1, \ldots, i'_D$).

Supposing $\mathcal{D} = \{X_1, \ldots, X_N\}$ is observed dataset, the log likelihood of dataset is defined as follows under the joint distribution $$l = \frac{1}{N} \sum_{n=1}^{N} \log\left(\sum_{\mathcal{Y} \in \mathbb{Y}} \exp\{-E(\mathcal{X}_n, \mathcal{Y})\}\right) - \log Z(\Theta)$$

By calculation, we can obtain that the derivation of likelihood function with respect to any parameter $\theta$ in $\Theta$ is $$\frac{\partial l}{\partial \theta} = -\frac{1}{N} \sum_{n=1}^{N} \sum_{\mathcal{Y} \in \mathbb{Y}} p(\mathcal{Y} \mid \mathcal{X}_n; \Theta) \frac{\partial E(\mathcal{X}_n, \mathcal{Y}; \Theta)}{\partial \theta} +$$

$$\sum_{\mathcal{X}' \in \mathbb{X}, \mathcal{Y}' \in \mathbb{Y}} p(\mathcal{X}', \mathcal{Y}'; \Theta) \frac{\partial E(\mathcal{X}', \mathcal{Y}'; \Theta)}{\partial \theta}.$$

The first term of the right-hand side of the above formula can be seen as the data expectation and the second term is the model expectation. Model expectation is difficult to compute, because it involves the summation of all values in the whole space $\mathbb{X}$ and $\mathbb{X}$. To avoid this, we can utilize contrastive divergence (CD) learning to approximate model expectation by Gibbs sampling according to the model distribution. First, selecting a sample $\mathcal{X}_n^{(0)}$ from the training sample set as initialization and then we can obtain $$\{\mathcal{X}_n^{(0)}, \mathcal{Y}_n^{(0)}, \mathcal{Y}_n^{(1)}, \ldots, (\mathcal{X}_n^{(k)}, \mathcal{Y}_n^{(k)}), \ldots\}$$

Therefore, the model expectation can be approximated by samples $\{\mathcal{X}_n^{(k)}\}_{n=1}^{N}$ at step k in the CD-k algorithm, that is, $$\sum_{\mathcal{X}' \in \mathbb{X}, \mathcal{Y}' \in \mathbb{Y}} p(\mathcal{X}', \mathcal{Y}'; \Theta) \frac{\partial E(\mathcal{X}', \mathcal{Y}'; \Theta)}{\partial \theta} =$$

$$\sum_{\mathcal{X}' \in \mathbb{X}} \left(\sum_{\mathcal{Y}' \in \mathbb{Y}} p(\mathcal{Y}' \mid \mathcal{X}'; \Theta) \frac{\partial E(\mathcal{X}', \mathcal{Y}'; \Theta)}{\partial \theta}\right) p(\mathcal{X}'; \Theta) \approx$$

$$\frac{1}{N} \sum_{n=1}^{N} \sum_{\mathcal{Y}' \in \mathbb{Y}} p(\mathcal{Y}' \mid \mathcal{X}_n^{(k)}; \Theta) \frac{\partial E(\mathcal{X}_n^{(k)}, \mathcal{Y}'; \Theta)}{\partial \theta}.$$

Thus obtain $$\frac{\partial l}{\partial \theta} \approx -\frac{1}{N} \sum_{n=1}^{N} \sum_{\mathcal{Y} \in \mathbb{Y}} p(\mathcal{Y} \mid \mathcal{X}_n; \Theta) \frac{\partial E(\mathcal{X}_n, \mathcal{Y}; \Theta)}{\partial \theta} + \quad (4)$$

$$\frac{1}{N} \sum_{n=1}^{N} \sum_{\mathcal{Y}' \in \mathbb{Y}} p(\mathcal{Y}' \mid \mathcal{X}_n^{(k)}; \Theta) \frac{\partial E(\mathcal{X}_n^{(k)}, \mathcal{Y}'; \Theta)}{\partial \theta}$$

For clarity, define two metrics $i_d^- := (i_1, \ldots, i_{d-1})$ and $i_d^+ := (i_{d+1}, \ldots, i_D)$. In the following, we introduce two new notations for the products of core matrices:

$$P_d^-[i_d^-, j_d^-] := G_1[i_1, j_1] \ldots G_{d-1}[i_{d-1}, j_{d-1}]$$

and $$P_d^+[i_d^+, j_d^+] := G_{d+1}[i_{d+1}, j_{d+1}] \ldots G_D[i_D, j_D]$$

For the core matrix $G_d[\tilde{i}_d, \tilde{j}_d]$, we give the calculating process of $$\frac{\partial l}{\partial G_d[\tilde{i}_d, \tilde{j}_d]}.$$

As for other parameters, the derivative can also be calculated similarly. From (1), we have $$\frac{\partial E(\mathcal{X}, \mathcal{Y}; \Theta)}{\partial G_d[\tilde{i}_d, \tilde{j}_d]} = \qquad(5)$$

$$-\sum_{\substack{i_d^-, i_d^+ \\ j_d^-, j_d^+}} \mathcal{X}(i_d^-, \tilde{i}_d, i_d^+) \mathcal{Y}(j_d^-, \tilde{j}_d, j_d^+)(P_d^-[i_d^-, j_d^-])^T (P_d^+[i_d^+, j_d^+])^T$$

Because $\mathcal{Y}$ or is $\mathcal{Y}$ binary variable, the probability of $\mathcal{Y} = 1$ is actually the mean value of $\mathcal{Y}$. Inserting (5) to (3), the derivation of likelihood function with respect to $G_d[\tilde{i}_d, \tilde{j}_d]$ is obtained $$\frac{\partial l}{\partial G_d[\tilde{i}_d, \tilde{j}_d]} \approx \qquad(6)$$

$$\frac{1}{N}\sum_{n=1}^{N} \sum_{\substack{i_d^-, i_d^+ \\ j_d^-, j_d^+}} p(\mathcal{Y}_n(j_d^-, \tilde{j}_d, j_d^+) = 1 \mid \mathcal{X}_n; \Theta) \times \mathcal{X}_n(i_d^-, \tilde{i}_d, i_d^+)$$

$$(P_d^-[i_d^-, j_d^-])^T (P_d^+[i_d^+, j_d^+])^T -$$

$$\frac{1}{N}\sum_{n=1}^{N} \sum_{\substack{i_d^-, i_d^+ \\ j_d^-, j_d^+}} p(\mathcal{Y}_n^{(k)}(j_d^-, \tilde{j}_d, j_d^+) = 1 \mid \mathcal{X}_n^{(k)}; \Theta) \times$$

$$\mathcal{X}_n^{(k)}(i_d^-, \tilde{i}_d, i_d^+)(P_d^-[i_d^-, j_d^-])^T (P_d^+[i_d^+, j_d^+])^T$$

Applying the similar approach, for the bias parameters, we obtain $$\frac{\partial l}{\partial \mathcal{B}} \approx \frac{1}{N}\sum_{n=1}^{N} \mathcal{X}_n - \frac{1}{N}\mathcal{X}_n^{(k)} \qquad(7)$$

and $$\frac{\partial l}{\partial C} \approx \frac{1}{N}\sum_{n=1}^{N} p(\mathcal{Y}_n = 1 \mid \mathcal{X}_n; \Theta) - \frac{1}{N}\sum_{n=1}^{N} p(\mathcal{Y}_n^{(k)} = 1 \mid \mathcal{X}_n^{(k)}; \Theta) \qquad(8)$$

From model (1), we can see that the energy function only relies on the product of parameters $G_d[i_d, j_d]$, $d = 1, \ldots, D$. One parameter going up in any scale S and the other going down to 1/s do not affect the value of energy function. To avoid this problem, in the log likelihood objective 1, we add a penalty $$\frac{\beta}{2}\|G_d[i_d, j_d]\|_F^2.$$

The learning algorithm of overall CD procedure for TTRBM is summarized in Table 1.

The reconstruction errors between the original sample set and the reconstructed sample set can be defined as $$e(t) = \frac{\sum_{n=1}^{N} \|\mathcal{X}_i - \hat{\mathcal{X}}_i\|_F^2}{N}$$

Where $\hat{x} \approx \mathcal{Y}_i^k \times_1 G_{1(t)}^T \ldots \times_D G_{D(1)}^T$, In addition, $\hat{x}_i^t$, $\mathcal{Y}_i^t$ and $G_d$ represent the updating results of tth iteration. When iteration steps exceed the maximum iteration number T or the reconstruction error satisfies $|e(t)-e(t+1)| < \epsilon$, the iteration algorithm terminates.

TABLE 1

Algorithm 1: CD-K Algorithm for TTRBM

Input: Given the training dataset $\mathcal{D} = \{\mathcal{X}_1, \ldots, \mathcal{X}_N\}$ consisting of N tensors samples, the maximum iteration number T (default value = 10000) and $\epsilon$, the learning rate $\alpha$ (default value = 0.05), the weight regularizer $\beta$ (default value = 0.01), the momentum $\gamma$ (default value = 0.5), the batch size b (default value = 100), and the CD step K (default value = 1).
Output: Parameter set $\Theta = \{B, C, G_d[i_d, j_d]\}$.
Initialize: Initializing $G_d[i_d, j_d]$ randomly, $B = 0$, $\mathcal{C} = 0$ and $\Delta G_d[i_d, j_d] = \Delta B = \Delta C = 0$.
for t = 1:T do
  Divide $\mathcal{D}$ into M batches $\mathcal{D}_1, \ldots, \mathcal{D}_M$ of size b randomly, then
for m = 1:M do
fixing current model parameters $\Theta$, rum the Gibbs sampling for all the data
$\mathcal{X}^{(0)} = \mathcal{X} \in \mathcal{D}_m$.
for k = 0:K-1 do
Fixing $\mathcal{X}^{(k)}$, update $\mathcal{Y}^{(k)}$ according to formula (3);
$\mathcal{Y}^{(k)}$, update $\mathcal{X}^{(k)}$ according to formula (2);
end;

TABLE 1-continued

Algorithm 1: CD-K Algorithm for TTRBM

Update the gradient increment by using (6) - (8):

$$\Delta G_d[i_d, j_d] = \gamma \Delta G_d[i_d, j_d] + \alpha\left(-\frac{\partial l}{\partial G_d[i_d, j_d]}\bigg|_{\mathcal{D}_m, \mathcal{D}_m^{(K)}} - \beta G_d[i_d, j_d]\right)$$

$$\Delta \mathcal{B} = \gamma \Delta \mathcal{B} + \alpha\left(-\frac{\partial l}{\partial \mathcal{B}}\bigg|_{\mathcal{D}_m, \mathcal{D}_m^{(K)}}\right)$$

$$\Delta C = \gamma \Delta C + \alpha\left(-\frac{\partial l}{\partial C}\bigg|_{\mathcal{D}_m, \mathcal{D}_m^{(K)}}\right)$$

Update model parameters: θ → θ + Δθ
end
Computing e(t). If '|e(t) − e(t + 1)| < ε, break;
end Experiment Test:
1. Reconstruction experiment We conduct reconstruction experiments to test the convergence of the TTRBM algorithm.

The experimental data are from the following two databases:

A subset of handwritten digits images from the MNIST database

The digit database contains 0-9 digits with 70,000 labeled images. The images of each digit are captured in grayscale and have a uniform size of 28*28 pixels. In this dataset, there are 60,000 training samples and 10,000 testing samples. In the reconstruction experiment, 2,000 training samples of each digit are selected to test the convergence of TTRBM.

The FERET face database

This database includes 200 different subjects with seven images per subject. All images are grayscale and cropped and normalized to a resolution of 32*32 pixels. In this experiment, we randomly selected 100 individuals to test the reconstruction error.

We use the default parameters δ, α and β as Algorithm 1. When D=2 and the TT-form rank r=[1,1,1], the TTRBM and MVRBM model are similar to each other. Both parameter layers are actually the product of two matrices, but with different matrix sizes. In the TTRBM model, two matrices $G_1$ and $G_2$ are of size $I_1 \times J_1$ and $I_2 \times J_2$, respectively. However, in the MVRBM model, the sizes of two matrices are $J_1^- \times I_1$ and $J_2 \times I_2$, respectively. Thus, we mainly compared the performance of the proposed model against the MVRBM model in reconstruction experiments.

In the first attempt using digit database, we set the size of the hidden matrix variate as 25*25. The maximum number of iteration is T=150.

It is obvious that our algorithm with r=[1,1,1] converged slightly faster than MVRBM. In addition, when we set the TT-rank r=[1,2,1], TTRBM converged much faster than the MVRBM. FIG. 1 shows several original digit images and their corresponding reconstructed images. The reconstruction images of different algorithms have almost the same visual effect. This is because different algorithms converge to almost the same average reconstruction errors. The average reconstruction errors of MVRBM and TTRBM with r=[1,2,1] are 10.2275/(28*28) and 9.7783/(28*28), respectively.

Figure 2:
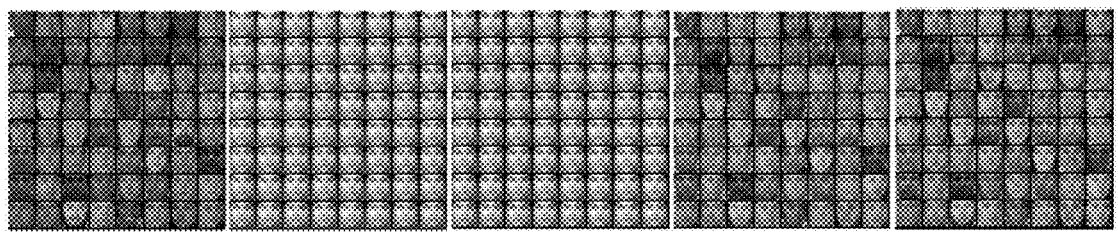
FIG. 2 shows a comparing result between original images (in the FERET database) and reconstructed images.
Figure 3:
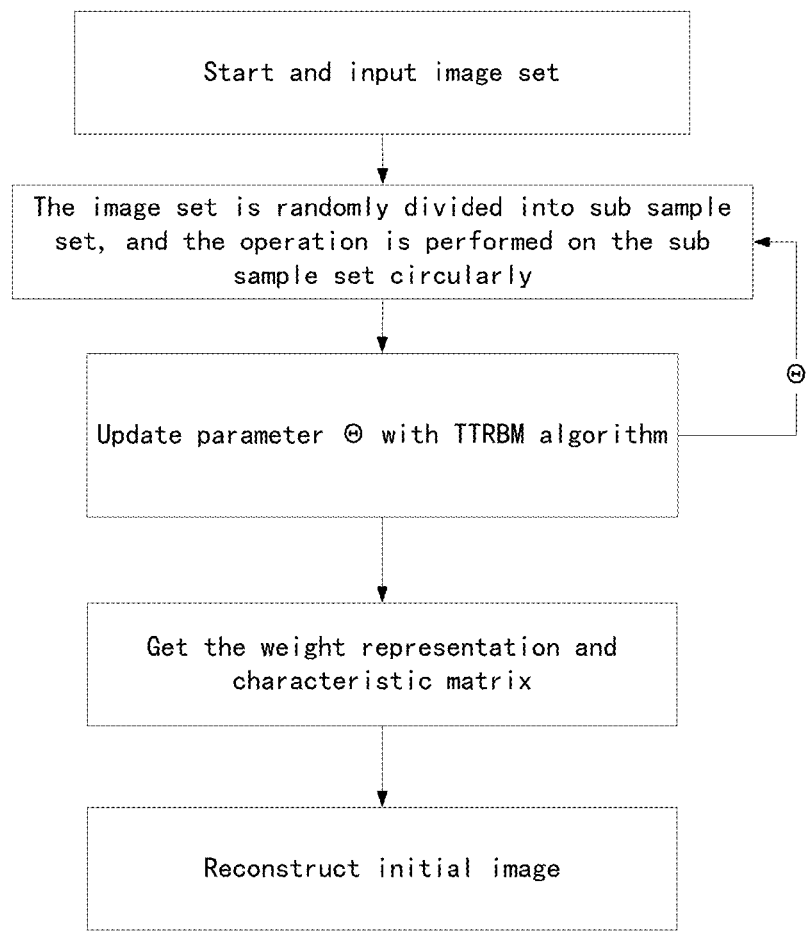
FIG. 3 is a flow chart according to a preferred embodiment of the invention.

Compared with MVRBM, the superiority of our proposed model is that we can adjust the TT-rank to reconstruct face images. We set r=[1,5,1] and r=[1,10,1]. The reconstruction results are shown that the reconstruction errors of TTRBM with r=[1,5,1] and r=[1,10,1] demonstrate a decreasing trend. It shows that the proposed TTRBM is convergent by adjusting rank r on face images. FIG. 2 shows several original face image and their corresponding reconstructions. It can be seen that MVRBM and TTRBM (r=[1,1,1]) cannot reconstruct the correct face images, however the reconstructed face images by TTRBM with r=[1,10,1] have much better visual effects.

2. Reconstruction of a Super-Resolution Image

The proposed TTRBM can also be described for learning a generative model of data that consists of multiple and diverse input modalities, which has been defined by Multimodal TTRBM. In this experiment, we test the performance of Multimodal TTRBM model on image super-resolution.

In the training phase, we used five matrix patches (X, $Z^1$, $Z^2$, $Z^3$, $Z^4$) as a training sample. X represents a high resolution patch, which is the raw image from the luminance Y channel in the YCbCr color space and ($Z^1$, $Z^2$, $Z^3$, $Z^4$) are low resolution patches, which are the directives of images in x-,y-,xx-,yy-derections of the Y channel. (X, $Z^1$, $Z^2$, $Z^3$, $Z^4$) can be seen as visible units, which are connected to the hidden layer Y. Thus, we can obtain the following energy function:

$$E(X, Z^1, \ldots, Z^4, Y; \Theta) = -\langle X, B \rangle - \langle Y, C \rangle -$$

$$\sum_{i=1}^{4} \langle Z^i, A_i \rangle - \sum_{\substack{i_1, i_2 \\ j_1, j_2}} X(i_1, i_2) Y(j_1, j_2) G_1[i_1, j_1] G_2[i_2, j_2] -$$

$$\sum_{i=1}^{4} \sum_{\substack{i_1^i, i_2^i \\ j_1, j_2}} Z(i_1^i, i_2^i) Y(j_1, j_2) Q_1^i[i_1^i, j_1] Q_2^i[i_2^i, j_2].$$

The joint distribution becomes $$p(X, Z^1, \ldots, Z^4, Y; \Theta) = \frac{1}{Z(\Theta)} \exp\{-E(X, Z^1, \ldots, Z^4, Y; \Theta)\}$$

To obtain training patches, we take image patches from 69 miscellaneous color images, which can be downloaded at http://decsai.ugr.es/cvg/dbimagenes/. Thus, we obtain the training set as $\mathcal{D} = \{(X_1, Z_1^1, Z_1^2, Z_1^3, Z_1^4), \ldots, (X_N, Z_N^1, Z_N^2, Z_N^3, Z_N^4)\}$ and randomly selected N=10,000 training patches from the miscellaneous database. The image patch size was fixed to 15*15 with a magnification factor of 2 and we set the hidden size to 20*20, which gave better results in all the tests conducted. Based on Multimodal TTRBM model, the parameter matrices $\{G_1[i_1,j_1], G_2[i_2,j_2]\}_{i_d,j_d}^{I_d,J_d}$ and $\{Q_1{}^i[1_1{}^i,1_j^i], Q_2{}^i[1_2{}^i,j_2]\}_{l_d^{ij},J_d}^{L_d^i,J_d}$ (d=1, 2) can be obtained in the training phase.

In testing phase, giving a low resolution image, its four low resolution feature input Z=$\{Z^1, Z^2, Z^3, Z^4\}$ can be obtained. Then we can get an estimated $X^0$ of the desired super-resolution patch X by using any simple super-resolution algorithm such as interpolation-based methods. Furthermore, $X^0$ and Z were used as the inputs of visible layer can be transferred to the hidden layer and getting the variable Y. Moreover, the message of the hidden layer will be transferred back to the visible layer and obtaining the super-resolution units X. Finally, we get the super-resolution image patch X after the process reaches equilibrium.

Table 2 shows the PSNRs for the classic bicubic interpolation, the SR, MVRBM, and the proposed TTRBM for a number of testing natural images.

TABLE 2

| Image | PNSR-Bicubic | PSNR-SR | PSNR-MVRBM | PSNR-TTRBM | Times-SR | Times-MVRBM | Times-TTRBM |
|---|---|---|---|---|---|---|---|
| athens | 33.2333 | 34.7536 | 34.4948 | 34.4950 | 555.453 | 35.234 | 40.610 |
| anhinga | 29.2949 | 30.4464 | 30.2720 | 30.2709 | 344.539 | 35.348 | 40.663 |
| baboon | 24.9455 | 25.7033 | 25.6939 | 25.6963 | 390.406 | 35.272 | 42.011 |
| barnfall | 30.8737 | 32.0302 | 31.9782 | 31.9782 | 567.408 | 34.825 | 42.657 |
| beeflowr | 34.6839 | 35.6362 | 35.3203 | 35.3413 | 511.712 | 35.143 | 39.570 |
| blakeyed | 31.7163 | 33.6690 | 32.8534 | 32.8607 | 325.29 | 35.429 | 39.765 |
| blueeye | 35.2188 | 36.3957 | 36.1106 | 36.1108 | 786.426 | 34.856 | 40.038 |
| bobcat | 33.1525 | 34.2699 | 34.1001 | 34.2112 | 590.128 | 35.084 | 42.312 |

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A processing method for image tensor data, comprising the steps:

introducing a TTRBM model of Restricted Boltzmann machine with a tensor train format, TTRBM is Restricted Boltzmann Machine of Tensor Train; representing input and output data of the processing method by a plurality of tensors; and representing a weight of a middle layer by the plurality of tensors, wherein a restricted weight has a structure of the tensor train; a number of free parameters in a middle layer is controlled by adjusting a rank of a tensor train (TT) decomposition; a rank of TT decomposition is adjusted; and different feature representations with a same size are expressed;

an energy function for the TTRBM model is formula (1):

$$E(\mathcal{X}, \mathcal{Y}; \Theta) = -\langle \mathcal{X}, \mathcal{B} \rangle - \langle \mathcal{Y}, C \rangle - \sum_{\substack{i_1,\ldots,i_D \\ j_1,\ldots,j_D}} \mathcal{X}(i_1,\ldots,i_D)\mathcal{Y}(j_1,\ldots,j_D)G_1[i_1,j_1]\ldots G_D[i_D,j_D], \quad (1)$$

wherein $x \in \mathbb{R}^I$, $y \in \mathbb{R}^J$ are a plurality of tensor visible and hidden units, respectively, both of the plurality of tensor visible and hidden units are binary variables; a network, $b \in \mathbb{R}^I$ and $c \in \mathbb{R}^J$ are a plurality of biases, $W \in \mathbb{R}^{I \times J}$ is a parameter matrix connecting the plurality of tensor visible and hidden units; denoting all model parameter as $\Theta = \{b, c, W\}$; where $G_d[i_d, j_d]$ is an $r_{d-1} \times r_d$ matrix and $G_d$ is $r_{d-1} \times I_d \times J_d \times r_d$ array; the sequence $\{r_d\}_d^D = 0$ is the TT-rank of the TT-format of W; based on the energy function, a joint distribution of X and Y is defined as $$p(\mathcal{X}, \mathcal{Y}; \Theta) = \frac{1}{Z(\Theta)}\exp\{-E(\mathcal{X}, \mathcal{Y}; \Theta)\},$$

wherein $\Theta$ denotes bias B, C, and a plurality of model parameter matrices $\{G_d[i_d, j_d]\}_d^D = 1$; in the above-mentioned joint distribution, $Z(\Theta)$ is a normalization constant and defined by $$Z(\Theta) = \sum_{\mathcal{X} \in \mathbb{X}, \mathcal{Y} \in \mathbb{Y}} \exp\{-E(\mathcal{X}, \mathcal{Y}; \Theta)\},$$

where $\mathcal{X}$ and $\mathcal{Y}$ represent binary value spaces of X and Y, respectively;

wherein the processing method for image tensor data is used to describe a generation model of learning a kind of data, and the generation model contains many kinds of data input, wherein the many kinds of data input is defined as a multimodal TTRBM;

wherein in a training phrase, five matrix patches (X, $Z^1, Z^2, Z^3, Z^4$) are used as a training sample; X represents a high resolution patch, wherein the resolution patch is the raw image from the luminance Y channel in a YCbCr color space and ($Z^1, Z^2, Z^3, Z^4$) are low resolution patches, wherein the low resolution patches are directives of images in x-,y-,xx-,yy-directions of a Y channel, and (X, $Z^1, Z^2, Z^3, Z^4$) is seen as a plurality of visible units, wherein the plurality of visible units are connected to a hidden layer Y; formula (1) is:

$$E(X, Z^1, \ldots, Z^4, Y; \Theta) = -\langle X, B \rangle - \langle Y, C \rangle - \sum_{i=1}^{4}\langle Z^i, A_i \rangle - \sum_{\substack{i_1,i_2 \\ j_1,j_2}} X(i_1,i_2)Y(j_1,j_2)G_1[i_1,j_1]G_2[i_2,j_2] -$$

-continued $$\sum_{i=1}^{4} \sum_{\substack{i_1^i, i_2^i \\ j_1, j_2}} Z(i_1^i, i_2^i) Y(j_1, j_2) Q_1^i[i_1^i, j_1] Q_2^i[i_2^i, j_2],$$

the joint distribution becomes $$p(X, Z^1, \ldots, Z^4, Y; \Theta) = \frac{1}{Z(\Theta)} \exp\{-E(X, Z^1, \ldots, Z^4, Y; \Theta)\}$$

to obtain a plurality of training patches, a plurality of image patches are taken from 69 miscellaneous color images, thus obtain a training set as D={$(X_1, Z_1^1, Z_1^2, Z_1^3, Z_1^4), \ldots, (X_N, Z_N^1, Z_N^2, Z_N^3, Z_N^4)$} and randomly selected N=10000, the plurality of training patches from a miscellaneous database; an image patch size is fixed to 15*15 with a magnification factor of 2 and a hidden size to 20*20;

in testing phase, giving a low resolution image, a four low resolution feature input Z={$Z^1, Z^2, Z^3, Z^4$} is obtained; then an estimated $X^0$ of a desired super-resolution patch is obtained by using any simple super-resolution algorithm; and, $X^0$ and Z were used as inputs of visible layer and a proposed TTRBM training algorithm is run; in the process, a message of a visible layer is transferred to the hidden layer and getting a variable Y; and, a message of the hidden layer is transferred back to the visible layer and obtaining super-resolution units X; and, the super-resolution image patch X is obtained after the process reaches equilibrium.

2. The processing method for image tensor data according to the claim 1, in formula (1), over all the other variables, a conditional density of each visible unit $X(i_1, \ldots, i_D)$ is deduced by $$p(X(i_1, \ldots, i_D) = 1 \mid \mathcal{Y}; \Theta) = \sigma\left(\sum_{j_1, \ldots, j_D} G_1[i_1, j_1] \ldots G_D[i_D, j_D] \mathcal{Y}(j_1, \ldots, j_D) + \mathcal{B}(i_1, \ldots, i_D)\right),$$ (2)

and over all the other variables, the conditional density of each hidden unit $Y(j_1, \ldots, j_D)$ is deduced by $$p(\mathcal{Y}(j_1, \ldots, j_D) = 1 \mid \mathcal{X}; \Theta) = \sigma\left(\sum_{i_1, \ldots, i_D} G_1[i_1, j_1] \ldots G_D[i_D, j_D] \mathcal{X}(i_1, \ldots, i_D) + C(j_1, \ldots, j_D)\right),$$ (3)

wherein $\sigma$ is a sigmoid function and $\sigma(x)=1/(1+e^{-x})$.

3. The processing method for image tensor data according to the claim 2, supposing D={$X_1, \ldots, X_N$} is an observed dataset, a log likelihood of dataset is defined as follows under the joint distribution:

$$l = \frac{1}{N} \sum_{n=1}^{N} \log\left(\sum_{n=1} \exp\{-E(X_n, \mathcal{Y})\}\right) - \log Z(\Theta),$$

with respect to any parameter $\theta$ in $\Theta$, is $$\frac{\partial l}{\partial \theta} = -\frac{1}{N} \sum_{n=1}^{N} \sum_{\mathcal{Y} \in \mathcal{Y}} p(\mathcal{Y} \mid \mathcal{X}_n; \Theta) \frac{\partial E(\mathcal{X}_n, \mathcal{Y}; \Theta)}{\partial \theta} + \sum_{\mathcal{X}' \in \mathcal{X}, \mathcal{Y}' \in \mathcal{Y}} p(\mathcal{X}', \mathcal{Y}'; \Theta) \frac{\partial E(\mathcal{X}', \mathcal{Y}'; \Theta)}{\partial \theta}$$

collecting a series of sample sets by means of Gibbs sampling, first, selecting a sample $X_n^{(0)}$ from a training sample set as initialization and then obtain by an iterative sampling $$\{(X_n^{(0)}, Y_n^{(0)}), (X_n^{(1)}, Y_n^{(1)}), \ldots, (X_n^{(k)}, Y_n^{(k)}), \ldots\}$$

replace a model expectation by $\{X_n^{(k)}\}_{n=1}^N$ $$\frac{\partial l}{\partial \theta} \approx -\frac{1}{N} \sum_{n=1}^{N} \sum_{\mathcal{Y} \in \mathcal{Y}} p(\mathcal{Y} \mid \mathcal{X}_n; \Theta) \frac{\partial E(\mathcal{X}_n, \mathcal{Y}; \Theta)}{\partial \theta} + \frac{1}{N} \sum_{n=1}^{N} \sum_{\mathcal{Y}' \in \mathcal{Y}} p(\mathcal{Y}' \mid \mathcal{X}_n^{(k)}; \Theta) \frac{\partial E(\mathcal{X}_n^{(k)}, \mathcal{Y}'; \Theta)}{\partial \theta},$$ (4)

denoting two notations $i_d^- := (i_1, \ldots, i_{d-1})$ and $i_d^+ := (i_{d+1}, \ldots, i_D)$, therefore, core matrices are respectively $$P_d^-[\tilde{i}_d^-, \hat{j}_d^-] := G_1[i_1, j_1] \ldots G_{d-1}[i_{d-1}, j_{d-1}], \text{ and}$$

$$P_d^+[i_d^+, j_d^+] := G_{d+1}[i_{d+1}, j_{d+1}] \ldots G_D[i_D, j_D],$$

a derivative for formula (1) with respect to the core matrix $G_d[\tilde{i}_d, \tilde{j}_d]$ is $$\frac{\partial E(\mathcal{X}, \mathcal{Y}; \Theta)}{\partial G_d[\tilde{i}_d, \tilde{j}_d]} = -\sum_{\substack{i_d^-, i_d^+ \\ j_d^-, j_d^+}} \mathcal{X}(i_d^-, \tilde{i}_d, i_d^+) \mathcal{Y}(j_d^-, \tilde{j}_d, j_d^+)(P_d^-[i_d^-, j_d^-])^T (P_d^+[i_d^+, j_d^+])^T,$$ (5)

because y or y' is a binary variable, a probability of y=1 is a mean value of y; by inserting formula (5) into formula (3), a bias derivative of likelihood function to $G_d[\tilde{i}_d, \tilde{j}_d]$ is $$\frac{\partial l}{\partial G_d[\tilde{i}_d, \tilde{j}_d]} \approx$$ (6)

$$\frac{1}{N} \sum_{n=1}^{N} \sum_{\substack{i_d^-, i_d^+ \\ j_d^-, j_d^+}} p(\mathcal{Y}_n(j_d^-, \tilde{j}_d, j_d^+) = 1 \mid \mathcal{X}_n; \Theta) \times \mathcal{X}_n(i_d^-, \tilde{i}_d, i_d^+)$$

$$(P_d^-[i_d^-, j_d^-])^T (P_d^+[i_d^+, j_d^+])^T -$$

$$\frac{1}{N} \sum_{n=1}^{N} \sum_{\substack{i_d^-, i_d^+ \\ j_d^-, j_d^+}} p(\mathcal{Y}_n^{(k)}(j_d^-, \tilde{j}_d, j_d^+) = 1 \mid \mathcal{X}_n^{(k)}; \Theta) \times$$

$$\mathcal{X}_n^{(k)}(i_d^-, \tilde{i}_d, i_d^+)(P_d^-[i_d^-, j_d^-])^T (P_d^+[i_d^+, j_d^+])^T,$$

for bias parameters, obtain $$\frac{\partial l}{\partial \mathcal{B}} \approx \frac{1}{N}\sum_{n=1}^{N} \mathcal{X}_n - \frac{1}{N}\mathcal{X}_n^{(k)}, \quad (7)$$

and $$\frac{\partial l}{\partial C} \approx \frac{1}{N}\sum_{n=1}^{N} p(\mathcal{Y}_n = 1 \mid \mathcal{X}_n; \Theta) - \frac{1}{N}\sum_{n=1}^{N} p(\mathcal{Y}_n^{(k)} = 1 \mid \mathcal{X}_n^{(k)}; \Theta). \quad (8)$$

4. The processing method for image tensor data according to claim 3, comprising the following steps:

(1) given a training dataset D={$X_1, \ldots, X_N$} consisting of N tensors samples, a maximum iteration number T (default value=10000) and $\epsilon$, a learning rate $\alpha$ (default value=0.05), a weight regularizer $\beta$ (default value=0.01), a momentum $\gamma$ (default value=0.5), a batch size b (default value=100), and a CD step K (default value=1);

(2) Initializing $G_d[i_d, j_d]$ randomly, B=0, C=0 and $\Delta G_d[i_d, j_d] = \Delta B = \Delta C = 0$;

(3) for t=1:T, doing the following step:
divide D into M batches $D_1, \ldots, D_M$ of size b randomly, then
for m=1:M, doing the following steps:
fixing current model parameters $\Theta$, running the Gibbs sampling for all the data $X^{(0)} = X \in D_m$;
for k=0:K−1, doing the following steps:
fixing $X^{(k)}$, updating $Y^{(k)}$ according to formula (3);
fixing $Y^{(k)}$, updating $X^{(k)}$ according to formula (2);
end;
updating a gradient increment by using (6)-(8):

$$\Delta G_d[i_d, j_d] = \gamma \Delta G_d[i_d, j_d] + \alpha\left(-\frac{\partial l}{\partial G_d[i_d, j_d]}\bigg|_{\mathcal{D}_m, \mathcal{D}_m^{(K)}} - \beta G_d[i_d, j_d]\right),$$

$$\Delta \mathcal{B} = \gamma \Delta \mathcal{B} + \alpha\left(-\frac{\partial l}{\partial \mathcal{B}}\bigg|_{\mathcal{D}_m, \mathcal{D}_m^{(K)}}\right),$$

$$\Delta C = \gamma \Delta C + \alpha\left(-\frac{\partial l}{\partial C}\bigg|_{\mathcal{D}_m, \mathcal{D}_m^{(K)}}\right),$$

updating model parameters; $\theta \rightarrow \theta + \Delta\theta$, end
computing e(t); if |e(t)−e(t+1)|<$\epsilon$, break;
end.

* * * * *